൩,൬൫൧,൧൧൧

United States Patent Office

Patented Mar. 21, 1972

3,651,111
AMIDE-NICKEL SALT COMPLEXES
Howard E. Dunn, Mount Vernon, Ind., assignor to
Phillips Petroleum Company
No Drawing. Filed Oct. 7, 1969, Ser. No. 864,564
Int. Cl. C07f 75/04; C07c 3/10
U.S. Cl. 260—439 R      2 Claims

ABSTRACT OF THE DISCLOSURE

Amide-nickel salt complexes having constituents of substituted 2-aminomalonamides and nickel salts are produced, which complexes are useful as a catalyst in the oligomerization of monoolefins. Bis[N,N'-dicyclohexyl-2 - (cyclohexylamino)malonamide] reacts with nickel chloride to form bis[N,N' - dicyclohexyl - 2 - (cyclohexylamino)malonamide]dichloronickel, which is used as an oligomerization catalyst for propylene.

BACKGROUND OF THE INVENTION

This invention relates to the production of novel amide-nickel salt complexes. In another aspect, this invention relates to a process for production of amide complexes of nickel salts from 2-aminomalonamides. In still another aspect, this invention relates to catalysis of oligomerization reactions of monoolefins.

A copending application, Ser. No. 795,676 presents a method of producing the novel substituted 2-aminomalonamides of which the present novel amide-nickel complexes are derivatives. This method entails reacting a suitable monoolefin with hydrogen cyanide and anhydrous hydrogen fluoride for a period of time sufficient to form a reaction product of these reactants. Suitable olefins for the reaction have the formula RCH=CHR wherein the total number of carbon atoms in the olefin molecule is in the range of 2 to about 30 carbon atoms and wherein R is selected from hydrogen and alkyl, cycloalkyl, and aryl radicals, and combinations thereof. The reaction mixture is then hydrolized with sufficient water to form a substituted 2-aminomalonamide.

Although nickel containing salts have been used as catalyst for olefin oligomerization, prior to this invention a complex of a nickel salt and a substituted 2-aminomalonamide has been unknown for such use.

Accordingly, an object of this invention is to provide novel amide-nickel salt complexes.

Another object of this invention is to provide a suitable catalyst for monoolefin oligomerization.

Other aspects, objects, and the several advantages of this invention will be apparent to those skilled in the art from a study of this disclosure.

SUMMARY OF THE INVENTION

In accordance with the invention an amide-nickel salt complex is produced by contacting a substituted salt 2-aminomalonamide and a nickel salt at a temperature and for a time sufficient to produce the complex. This reaction can be carried out in the presence of a diluent in which both of the reactants are at least partially soluble. If a diluent is used the amide-nickel salt complex can be separated by a suitable means of purification from the diluent in which it is formed.

In another embodiment of the invention the amide-nickel salt complex produced above is a suitable catalyst for olefin oligomerization. The amide-nickel salt complex can be contacted with an organoaluminum compound and an olefin or mixture of olefins at a temperature for a time sufficient to oligomerize the olefins present.

A process for preparing the substituted 2-aminomalonamides which is suitable for the preparation of the novel nickel complex of the present invention is described in a copending application, Ser. No. 795,676. The compounds suitable for the present invention can be represented by the formula

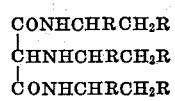

wherein each R is selected from hydrogen and alkyl, cycloalkyl, and aryl radicals, and combinations thereof such as alkaryl radicals, aralkyl radicals, and the like with the further proviso that two R groups together, on adjacent carbon atoms, can represent a divalent radical selected from alkylene, cycloalkylene, cycloalkyl- and aryl-substituted alkylene, and alkyl-, cycloalkyl-, and aryl-substituted cycloalkylene. In a presently preferred embodiment the total number of carbon atoms in the malonamide does not exceed about 93 carbon atoms.

Some examples of suitable substituted 2-aminomalonamides are

N,N'-diisopropyl-2-(isopropylamino)malonamide,
N,N'-diethyl-2-(ethylamino)malonamide,
N,N'-di-sec-butyl-2-(isopropylamino)malonamide,
N,N'-di-sec-butyl-2-(sec-butylamino)malonamide,
N,N'-bis(1-methylbutyl)-2-(1-methylbutylamino)
  malonamide,
N,N'-bis(1-methylnonacosyl)-2-(1-methylnonacosyl-
  amino)malonamide,
N,N'-bis(1-methyl-3-cyclohexylpropyl)-2-(1-methyl-3-
  cyclohexylpropylamino)malonamide,
N,N'-bis(4-phenylcyclohexyl)-2-(4-phenylcyclohexyl-
  amino)malonamide,
N,N'-di-2-norbornyl-2-(2-norbornylamino)malonamide, and the like mixtures thereof.

Any convenient nickel (II) salt can be used for preparing the novel nickel complex of the present invention. Preferred nickel salts are the nickel halides, the nickel pseudo halides, or the nickel salts of inorganic or organic acids. Some examples of suitable nickel salts are $NiCl_2$, $NiCl_2 \cdot 6H_2O$, $NiBr_2$, $NiI_2$, $NiF_2$, $Ni(CN)_2$, $Ni(SCN)_2$, $Ni(OCN)_2$, $Ni(acetate)_2$, $Ni(benzoate)_2$, $Ni(NO_3)_2$, $NiSO_4$, and the like, and mixtures thereof.

The novel nickel complex of the present invention is prepared by combining the suitable nickel salt and the suitable substituted 2-aminomalonamide under conditions of time and temperature which are sufficient to permit the complex to be formed. In such a preparation, the molar proportion of the substituted 2-aminomalonamide to the nickel salt will be approximately 2:1 although other proportions in the range of from about 0.5:1 to about 5:1 can be used but at the obvious expense of economy. The contact of these two ingredients will generally be made at a temperature in the range of about −25 to about 135° C., preferably 0 to about 60° C., for a time in the range of from a few seconds up to about 24 hours, preferably in the presence of a diluent in which the ingredients of the reaction are at least partially soluble. For preparing the amide-nickel salt complex alcoholic solvents are generally preferred because of their availability. Lower mono-hydroxy alcohols such as methanol, ethanol, isopropanol, and the like, can be used.

Examples of novel nickel complexes produced by this invention are:

bis[N,N'-diethyl-2-(ethylamino)malonamide]dichloronickel,
bis[N,N'-diisopropyl-2-(isopropylamino)malonamide]
  dibromonickel, bis[N,N'-di-sec-butyl-2-(sec-butylamino)malonamide]
   dicyanonickel,
bis[N,N'-bis(1-methylbutyl)-2-(1-methylbutylamino)
   malonamide]dichloronickel,
bis[N,N'-bis(1-ethylpropyl)-2-(1-ethylpropylamino)
   malonamide]diacetatonickel,
bis[N,N'-bis(1-ethylbutyl)-2-(1-ethylbutylamino)
   malonamide]diiodonickel,
bis[N,N'-bis(1-methylheptyl)-2-(1-methylheptylamino)
   malonamide]dibenzoatonickel,
bis[N,N'-bis(1-ethyloctyl)-2-(1-ethyloctylamino)
   malonamide]dithiocyanatonickel,
bis[N,N'-bis(1-methylundecyl)-2-(1-methylundecyl-
   amino)malonamide]dichloronickel,
bis[N,N'-bis(1-butyldecyl)-2-(1-butyldecylamino)
   malonamide]sulfatonickel,
bis[N,N'-bis(1-methylpentadecyl)-2-(1-methylpentadecyl-
   amino)malonamide]nitratonickel,
bis[N,N'-bis(1-nonylundecyl)-2-(1-nonylundecylamino)
   malonamide]dichloronickel,
bis[N,N'-bis(1-methylnonacosyl)-2-(1-methylnonacosyl-
   amino)malonamide]difluoronickel,
bis[N,N'-bis(1-methyl-2-ethylbutyl)-2-(1-methyl-2-ethyl-
   butylamino)malonamide]dichloronickel,
bis[N,N'-bis(1-ethyl-2-isopropylhexyl)-2-(1-ethyl-2-
   isopropylhexylamino)malonamide]dibromonickel,
bis[N,N'-bis(1-propyl-3-tert-butylheptyl)-2-(1-propyl-3-
   tert-butylheptylamino)malonamide]dichloronickel,
bis[N,N'-bis(1-methyl-3-cyclohexylpropyl)-2-(1-methyl-
   3-cyclohexylpropylamino)malonamide]dibromonickel,
bis[N,N'-bis[1-ethyl-3-(2-methylcyclopentyl)butyl]-2-
   [1-ethyl-3-(2-methylcyclopentyl)butylamino]
   malonamide]dipropionatonickel,
bis[N,N'-bis(α-methylbenzyl)-2-(α-methylbenzylamino)
   malonamide]diiodonickel,
bis[N,N'-bis(1-benzylbutyl)-2-(1-benzylbutylamino)
   malonamide]dibromonickel,
bis[N,N'-bis[1-(2-p-tolylpropyl)pentyl]-2-[1-(2-p-tolyl-
   propyl)pentylamino]malonamide]dicyanatonickel,
bis[N,N'-dicyclobutyl-2-(cyclobutylamino)malonamide]
   dinitratonickel,
bis[N,N'-dicyclopentyl-2-(cyclopentylamino)malon-
   amide]oxalatonickel,
bis[N,N'-dicyclohexyl-2-(cyclohexylamino)malonamide]
   sulfatonickel,
bis[N,N'-bis(3-methylcyclooctyl)-2-(3-methylcyclo-
   octylamino)malonamide]dichloronickel,
bis[N,N'-dicyclododecyl-2-(cyclododecylamino)
   malonamide]diiodonickel,
bis[N,N'-dicyclooctadecyl-2-(cyclooctadecylamino)
   malonamide]dithiocyanatonickel,
bis[N,N'-bis(4-phenylcyclohexyl)-2-(4-phenylcyclo-
   hexylamino)malonamide]dichloronickel,
bis[N,N'-bis(5-cyclopentylcyclooctyl)-2-(5-cyclopentyl-
   cyclooctylamino)malonamide]dibenzoatonickel,
bis[N,N'-di-2-norbornyl-2-(2-norbornylamino)malon-
   amide]difluoronickel,
bis[N,N'-bis(5-methyl-2-norbornyl)-2-(5-methyl-2-
   norbornylamino)malonamide]dibutyratonickel,
bis[N,N'-bis(5-phenyl-2-norbornyl)-2-(5-phenyl-2-nor-
   bornylamino)malonamide]dichloronickel,
bis[N,N'-bis(1-cyclohexyl-2-norbornyl)-2-(1-cyclohexyl-
   2-norbornylamino)malonamide]difluoronickel,
bis[N,N'-bis(1-methylbutyl)-2-(1-ethylpropylamino)
   malonamide]diiodonickel,
bis[N,N'-bis(1-ethylpropyl)-2-(1-methylbutylamino)
   malonamide]dibromonickel,
bis[N-(1-methylbutyl)-N'-(1-ethylpropyl)-2-(1-methyl-
   butylamino)malonamide]dichloronickel,
bis[N-(1-methylbutyl)-N'-(1-ethylpropyl)-2-(1-ethyl-
   propylamino)malonamide]dichloronickel
and the like.

These novel nickel complexes can be represented by the formula:

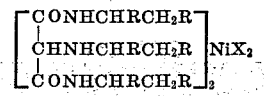

wherein each R is selected from hydrogen and alkyl, cycloalkyl, and aryl radicals, and combinations thereof such as alkaryl radicals, aralkyl radicals, and the like with the further proviso that two R groups together, on adjacent carbon atoms, can represent a divalent radical selected from alkylene, cycloalkylene, cycloalkyl- and aryl-substituted alkylene, and alkyl-, cycloalkyl, and aryl-substituted cycloalkylene; and wherein X is an element or radical that will combine with nickel to form a nickel salt.

The amide-nickel salt complex thus produced can be used in the preparation of a catalyst which will promote the oligomerization of monoolefins. The catalyst is prepared by the combination of a suitable organoaluminum compound with the novel nickel complex under conditions of time and temperature which permit the catalytically active reaction product to form. This combination occurs very readily and, in general, these components can be mixed at any convenient temperature within the range of −80 to about 100° C. for a few seconds or for periods of up to several hours in the presence of a diluent in which both the components are at least partially soluble. Any convenient diluent such as benzene, heptane, cyclohexane, chlorobenzene, methylene chloride, ethylene chloride, and the like can be used for this purpose. Halogenated diluents are frequently preferred. The mixing of the two catalyst components is generally carried out in the substantial absence of air or moisture, generally in an inert atmosphere. After the catalytic species is formed, it need not be isolated but may be added directly to the olefin oligomerization zone as a solution in its preparation solvent. If desired, the catalyst components can be separately added, in any order, to the reaction zone either in the presence or absence of the feed olefin. However, it has been found that catalysts of greater activity are obtained when the nickel complex is contacted first with the olefin and then with the organoaluminum compound.

The olefins which can be oligomerized (generally to dimers) by the novel catalyst system of the present invention include both acyclic and cyclic olefins having up to about 12 carbon atoms per molecule. These can be branched or unbranched, terminal or internal, but any branching is preferably at least one carbon atom removed from the double bond. Some specific examples of these are ethylene, propylene, butene-1, butene-2, pentene-1, pentene-2, cyclopentene, cyclohexene, 3-methylbutene-1, cycloheptene, hexene-2, heptene-1, cyclooctene, 4,4-dimethylheptene-2, decene-1, dodecene-1, and the like, and mixtures thereof. Terminal acyclic olefins having up to about 6 carbon atoms are presently preferred and particularly effective results are obtained with ethylene and propylene.

The organoaluminum compounds suitable for use in preparing the novel catalyst system of the present invention are selected from those having the formulas: $R_3Al$, $R_2AlX$, or $RAlX_2$. These compounds are well known in the art and can be prepared by conventional methods. Some specific examples of these are methylaluminum dichloride, dimethylaluminum chloride, diethylaluminum bromide, vinylaluminum diiodide, tributylaluminum, dibutylaluminum chloride, phenylaluminum dibromide, dibenzylaluminum chloride, 4-tolylaluminum dichloride, dodecylaluminum dibromide, eicosylaluminum difluoride, and the like, and mixtures thereof such as methylaluminum sesquichloride and ethylaluminum sesquichloride. Presently preferred aluminum compounds are those containing radicals of the lower alkyl hydrocarbons such as methyl and ethyl.

An organoaluminum compound and the complex nickel compound are generally utilized, for use in this invention, in proportions in the range of from about 0.5:1 to about 30:1 moles of the aluminum compound per mole of the nickel complex. Still greater quantities of the aluminum component are sometimes desirable to scavenge catalyst poisons which may be in the system.

The oligomerization of the olefin or mixture of olefins can take place at any convenient temperature within the broad range of about −80 to about 200° C., preferably −10 to about 50° C. The reaction can be carried out at any convenient pressure which is sufficient to keep at least some olefin feed dissolved in the reaction medium. Thus, the reaction is carried out in the liquid phase and pressures in the range of from about 0 to about 2000 p.s.i.g. can be used. The reaction can be carried out either in the presence or absence of a diluent, preferably in the presence of a diluent, and diluents such as those described for the catalyst preparation can be used. The time of contact will depend upon the degree of conversion but will, generally, be in the range of from about 0.1 minute to 20 hours, preferably 5–120 minutes. The proportion of catalyst composition to olefin feed in the reaction zone will generally be in the range of from about 0.001–100 millimoles of nickel complex for each mole of olefin feed.

Any conventional contacting technique can be utilized for the olefin oligomerization, and batchwise or continuous operation can be utilized. After the reaction period, the products can be separated and/or isolated by conventional means such as by fractionation, crystallization, adsorption, and the like. If desired, the catalyst can be destroyed by treatment with water prior to the separation of products.

The process will generally produce substantial quantities of olefinic dimers. However, other higher oligomers such as trimers, tetramers, and the like can also be present in varying degrees depending upon the olefin.

Below are presented illustrative examples of a typical preparation of an amide-nickel salt complex of this invention and the use of this complex in catalyzing the oligomerization of a monoolefin.

EXAMPLE I

Preparation of bis[N,N'-dicyclohexyl-2-(cyclohexylamino)malonamide]dichloronickel To a 7 ounce glass reactor, equipped with a magnetic stirrer, were added 1.19 g. (5 mmoles) of $NiCl_2 \cdot 6H_2O$ and 10 ml. of absolute ethanol. The mixture was stirred at room temperature to dissolve the nickel salt.

To another stirrer equipped flask were added 1.82 g. (5 mmoles) of bis[N,N'-dicyclohexyl-2-(cyclohexylamino)malonamide] and 10 ml. of absolute ethanol. The mixture was stirred and warmed to dissolve the solid.

The nickel solution was added to the amide solution. On stirring and cooling, a fine baby-blue precipitate separated. It was then warmed to redissolve the solid, and the stirring was stopped and the solution allowed to stand over night at room temperature to allow the crystals to form undisturbed. Well-formed baby-blue crystals were the result. These were filtered and dried under vacuum in a desiccator at room temperature over anhydrous calcium sulfate yielding 1.47 g. of the novel nickel complex bis[N,N' - dicyclohexyl - 2 - (cyclohexylamino)malonamide]dichloronickel.

An elemental analysis of the novel complex, calculated as $(C_{21}H_{37}N_3O_2)_2NiCl_2$, was carried out with the following results:

| Element | Calculated, wt. percent | Found, wt. percent |
|---|---|---|
| C | 58.8 | 58.5 |
| H | 8.7 | 8.3 |
| N | 9.9 | 9.9 |
| Cl | 8.3 | 9.6 |

The novel complex was stable in that it did not change when heated up to 250° C.

EXAMPLE II

Oligomerization of propylene using bis[N,N'-dicyclohexyl-2-(cyclohexylamino)malonamide]dichloronickel as a catalyst To a dry 7 ounce glass reaction flask, fitted with a magnetic stirrer, were added 20 ml. of chlorobenzene and 0.0493 g. (0.1 mmole) of bis[N,N'-dicyclohexyl-2-(cyclohexylamino)malonamide]dichloronickel. Propylene was pressured in at 30 p.s.i.g. to saturate the solvent. The pressure was then reduced to 5 p.s.i.g. and 1.5 ml. of a 1 molar ethylaluminum dichloride solution in chlorobenzene was added. The propylene pressure was again increased to 30 p.s.i.g. and propylene was slowly absorbed by the reaction mixture. After 10 minutes, an additional 1.5 ml. quantity of the 1 molar solution of ethylaluminum dichloride was added. During the next 30 minutes, propylene was absorbed by the reaction mixture very rapidly.

The reaction mixture was then quenched by the addition of 20 ml. of water, the organic layer was separated, and 34.4 g. of propylene dimers were isolated by distillation.

A sample of the dimers was catalytically reduced with hydrogen and the simplified mixture was analyzed by gas-liquid chromatography to learn the skeletal distribution of the original propylene dimers. The analysis of the hydrogenated mixture showed, in weight percent, the following: 60.50 2-methylpentane, 35.23 n-hexane, 1.87 2,3-dimethylbutane, and 2.40 3-methylpentane.

I claim:

1. An amide-nickel salt complex of the formula

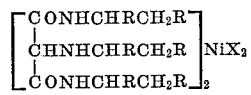

wherein R is selected from the group consisting of hydrogen and alkyl, cycloalkyl and aryl radicals and combinations thereof, with the further proviso that two R groups together on adjacent carbon atoms can represent a divalent radical selected from alkylene, cycloalkylene, cycloalkyl and aryl-substituted alkylene, and alkyl-, cycloalkyl-, and aryl-substituted cycloalkylene; wherein the total number of carbon atoms in the amide portion of the complex does not exceed about 93 carbon atoms per amide moiety; and wherein $NiX_2$ is selected from the group consisting of nickel halides, nickel pseudohalides, or the nickel salts of organic or inorganic acids.

2. The amide-nickel salt complex of claim 1 wherein the said complex is bis[N,N'-dicyclohexyl-2-(cyclohexylamino)malonamide]dichloronickel.

References Cited

UNITED STATES PATENTS 2,854,458    9/1958    Reppe et al. _____ 260—326.5

TOBIAS E. LEVOW, Primary Examiner

A. P. DEMERS, Assistant Examiner

U.S. Cl. X.R.

252—431 N; 260—429 J, 683.15 D